Oct. 5, 1954

W. O. BECHMAN 2,690,933

TRACK ROLLER ASSEMBLY

Filed Oct. 28, 1950

INVENTOR.
William O. Bechman
BY Paul O. Pippel
Atty.

Oct. 5, 1954   W. O. BECHMAN   2,690,933
TRACK ROLLER ASSEMBLY
Filed Oct. 28, 1950   2 Sheets-Sheet 2

INVENTOR.
William O. Bechman
BY Paul O. Pippel
Atty.

Patented Oct. 5, 1954

2,690,933

UNITED STATES PATENT OFFICE 2,690,933

TRACK ROLLER ASSEMBLY

William O. Bechman, Chicago, Ill., assignor to International Harvester Company, a corporation of New Jersey Application October 28, 1950, Serial No. 192,777

6 Claims. (Cl. 305—8)

This invention concerns roller structures suitable for use in supporting track frames of crawler type vehicles upon the ground-engaging flights of endless tracks caried thereby, and relates more particularly to improvements in bearing supports for such rollers and the lubrication of such bearings.

Heretofore the practice has been, when employing anti-friction bearing units for mounting track-engaging rollers upon the track frames of crawler vehicles, to mount the inner race of the bearing units upon a shaft secured non-rotatively in the track frame, and to place the rollers upon the outer race of the bearing units. A serious difficulty encountered with this prior structure has been the tendency of the part of the track roller on the outer race of the roller bearing units to expand pursuant to repeated pounding of the rollers upon the track. When this occurs the outer race of these bearing units becomes loose so the roller and bearings are no longer maintained accurately, causing rapid deterioration of the bearings and ultimate break-down of the roller assembly.

An important object of this invention is the provision of an improved form of track roller assembly wherein the roller is supported upon the inner race of anti-fricion bearing units at a position on the roller sufficiently removed from the track-engaging rim that negligible distortion of the roller occurs at the point of connection with the bearing race. This construction avoids the unwanted loosening of the bearing unit from the roller and prolongs the period between servicings of the roller assemblies.

A further advantage of placing the roller upon the inner race of the anti-friction bearing units is to diminish the linear speed and travel distance of the race surface contacting the rolling elements between the bearing unit races and thereby correspondingly diminish the amount of wear upon these units.

A further object of this invention is the provision of an improved roller lubricating system utilizing a lubricant reservoir within such roller together with a novel lubricating passage system through which the rollable elements of the anti-friction bearings can pump the lubricant through a series path including the reservoir.

Additional and more specific objects inherent in and encompassed by the invention will become apparent from the ensuing description, the appended claims and the annexed drawings wherein:

Figure 1:
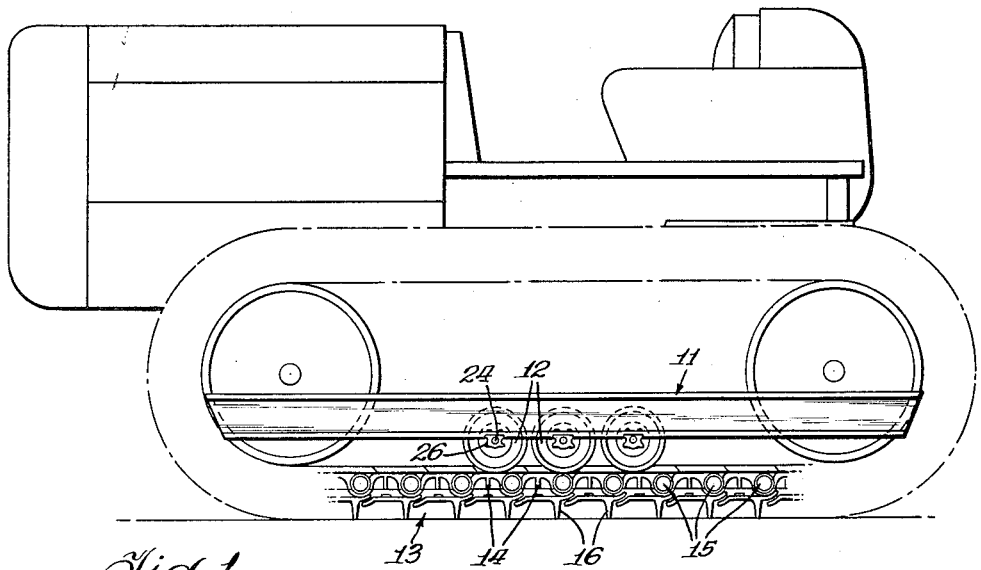
Fig. 1 is a diagrammatic side elevational view of a crawler type vehicle drawn to small scale to illustrate the environment for the invention.
Figure 3:
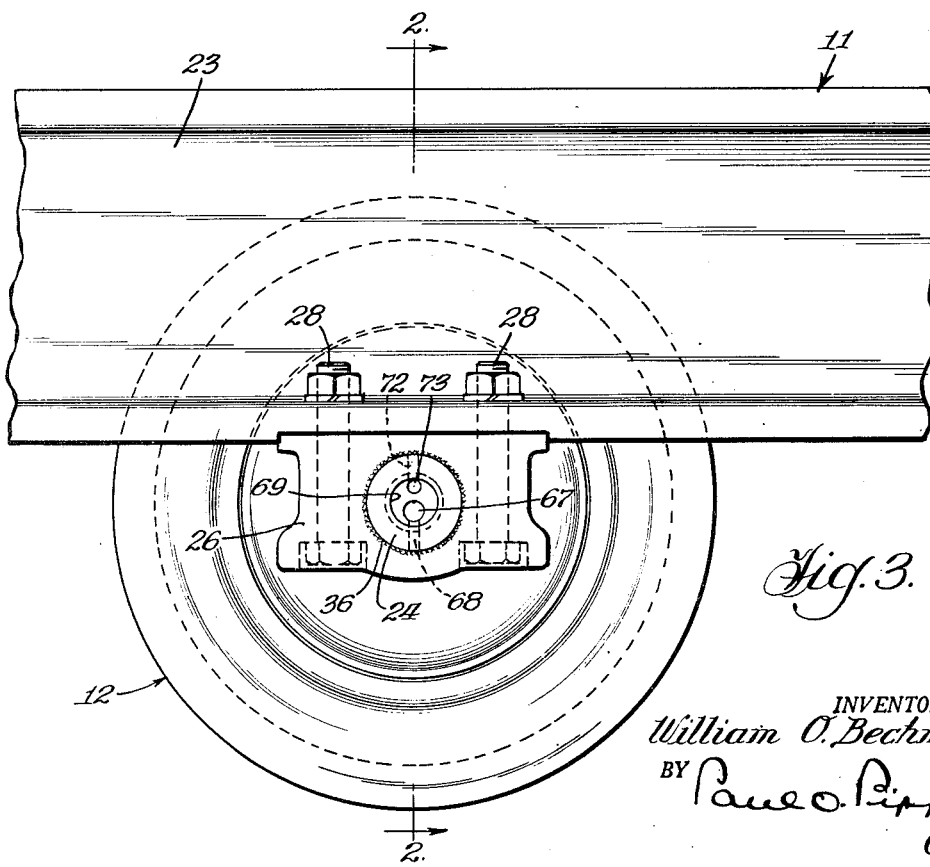
Fig. 3 is a fragmentary side elevational view of a track frame having the roller assembly of Fig. 2 mounted thereon, the roller assembly appearing in end elevation.
Figure 2:
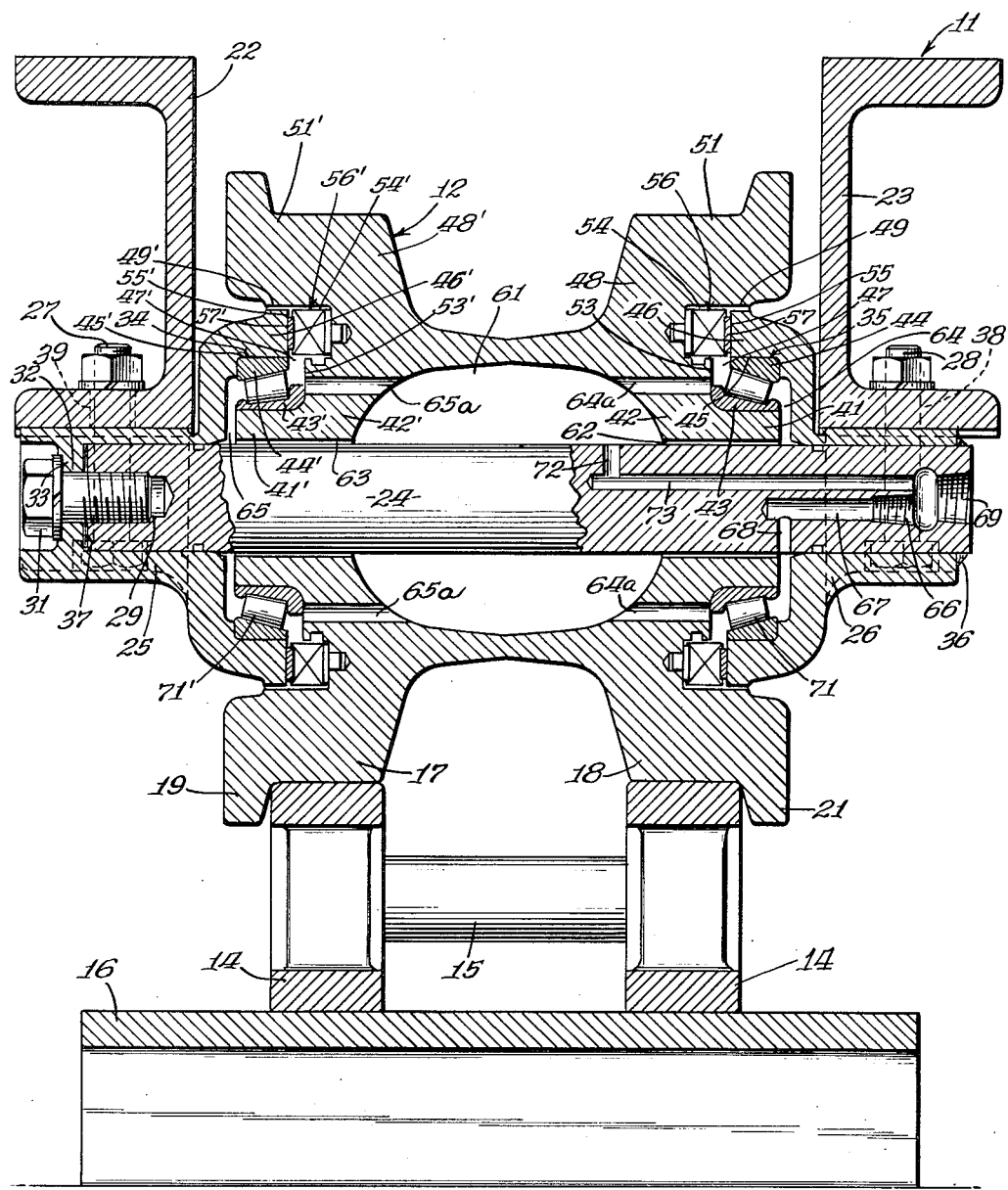
Fig. 2 is a vertical sectional view taken transversely through a track frame and longitudinally through a track roller assembly mounted on such frame and constructed according to this invention, the view being taken substantially at the plane indicated by the line 2—2 in Fig. 3.

With continued reference to the drawings, and particularly to Fig. 1, a track frame 11 there shown mounts a plurality of track rollers 12 which roll upon the lower flight of an endless track 13. This track comprises a plurality of links 14 pivotally connected by pins 15, and ground-engaging shoes 16 are respectively secured to laterally-spaced pairs of these links in the conventional manner. In Fig. 2 it can be seen that the track links 14 are arranged in two laterally-spaced rows and that each row of these links while in the ground-engaging flight of the track forms an articulated rail for engagement by rims 17 and 18 of the track rollers. Flange portions 19 and 21 of the rims 17 and 18 maintain the rollers upon these articulated track rails.

There is a track frame 11 on each side of the vehicle. These track frames, together with tracks and rollers associated therewith, are essentially identical. This description will be confined to the details of a single roller assembly on one track frame.

The track frame 11 comprises a pair of laterally-spaced channels 22 and 23 held rigidly in their relative positions by structure not shown since it is not essential to the disclosure of this invention. Each track roller assembly includes a non-rotatable shaft 24 having opposite end portions mounted respectively in brackets 25 and 26 which are secured to the under sides of the frame's channels 22 and 23 by bolts 27 and 28. The inner end of shaft 24 (left end as viewed in Fig. 2) contains a threaded recess 29 into which a cap screw 31 is threaded after passing through a hole 32 in a wall 33 of the bracket 25. The brackets 25 and 26 constitute bearing-supporting structures for anti-friction bearing units 34 and 35. The structure 26 has a welded connection at 36 with an outer end portion of the shaft 24 to fix the position of the bearing unit 35 axially of the shaft. Axial spacing of the bearing units 34 and 35 is selectively determined by the use of shims 37 between the inner end of the shaft and the apertured wall 33. This part of the assembly takes place before mounting the bearing-supporting structures 25 and 26 upon the track frame members 22 and 23. Such predetermined axial spacing of the bearings 34 and 35 is determined and maintained by the shims 37 complementally with the cap screw 31. Holes 38 in the lower flange of the track frame member 23 correspond in diameter to the shanks of bolts 28 so that when the sub-assembly comprising the shaft 24 and the bearing-supporting structures 25 and 26 are assembled with the track frame members 22 and 23, the holes 38 and bolts 28 will space the bearing units 35 predeterminedly from the track frame member 23. In Fig. 2 it can be seen that the holes 39 for bolts 27 are somewhat oversize with respect to the shanks of these bolts to enable these holes to receive the bolt shanks irrespective of the position of the bearing-supporting structure 25 lengthwise of the shaft 24 within an allowed tolerance limit.

Prior to assembly of the shaft 24 with the track frame 11 and also prior to placement of the bearing-supporting structure 25 on the inner end of the shaft 24, the roller 12 is telescoped over the inner end of the shaft and an axially extending portion 41 of a hub 42 thereof inserted into and thereby mounted upon an inner race 43 of the anti-friction bearing unit 35. The outer race 44 of this bearing unit will have been previously assembled within and against the inner periphery 45 of an annular flange 46 of the bearing-supporting structure 26. The flange 46 is projected into an annular recess 47 formed in an outer end of the roller 12 (the right end as viewed in Fig. 2). This recess is defined by the hub extension 41, a web 48 (projecting radially from the hub 42) and the inner periphery 49 of an axial extension 51 of the rail engaging rim 18 on the web 48. The bottom 53 of the annular recess 47 is formed on the web 48. A portion of the recess bottom 53 contains an annular countersunk recess 54 in coaxial relation with the annular recess 47. The countersunk recess 54 is in opposed spaced relation with an annular end face 55 on the flange 46 whereby a diagrammatically illustrated sealing structure 56 contained within the recess 54 can press the annular sealing element 57 thereof in sliding relation with the face 55.

Elements at the inner end of the roller correspond to elements as just described at the outer end of such roller and are designated by the same respective reference characters with the addition of a prime. After the bearing-supporting structures 25 and 26 have been placed on the shaft 24 together with the anti-friction bearing units 34 and 35, the seal structures 56 and 56' and the roller 12, and while all of these parts are on the assembler's bench, the cap screw 31 will be turned for forcing the apertured wall 33 against the necessary number of shims 37 for attaining the desired tightness of said bearing units. This sub-assembly is then mounted upon the track frame 11 by means of the bolts 27 and 28.

The roller 12 contains a cavity 61 which co-operates with the non-rotatable shaft 24 in forming a lubricant reservoir. Axial bores 62 and 63 in the roller are slightly oversize with respect to the shaft 24. Bore 62 provides communication between the lubricant reservoir and a radial space 64 which, in turn, communicates with the recess 47 at the outer end of the roller. Similar communication is provided by the bore 63 through a radial passage 65 with the recess 47' in the inner end of the roller. Roller web 48 contains lubricant-conducting passage means in the form of a plurality of bores 64a communicating between the lubricant reservoir and the bottom of the recess 47. A plurality of bores 65 corresponding to the bores 64a are provided in the web 48' to communicate between the lubricant reservoir and the bottom of the annular recess 47'.

A flowable lubricant is introduced into the roller cavity 61 by means of a conventional lubricant gun having a threaded coupling attachable to a threaded section 66 of an L-shaped passage 67—68 in the shaft 24. Access to the threaded section 66 is had when a threaded closure plug, not shown, is removed from a threaded recess 69 in the outer end of the shaft 24. Lubricant forced inwardly through the L-shaped passage 67—68 flows radially through the annular space 64 and between the rollers 71 of the bearing unit 35, thence through the passages 64a into the cavity 61. As the cavity fills with lubricant a portion thereof will migrate through the passages 63 and 65a into contact with the rollers 71' of the anti-friction bearing unit 34. When the cavity 61 becomes full, continued introduction of lubricant through the L-shaped passage 67—68 will cause an excess of lubricant to be forced outwardly through an L-shaped passage 72—73. When the operator notes spewing of lubricant from passage leg 73 into the recess 69 this will manifest that the roller cavity and passages have been filled, whereupon the gun will be detached from the threaded passage portion 66, and the closure plug, not shown, will be turned into the threaded recess 69.

Rotation of the roller 12 and consequent planetation of the tapered rolling elements 71 and 71' will cause pumping of the lubricant from the cavity 61 through the passages 62 and 63, thence radially through the spaces 64 and 65 between the circumferentially spaced roller elements 71 and 71' and back to the reservoir through the passages 64a and 65a. This assures turbulation of the lubricant and an adequate supply thereof to the bearing units 34 and 35.

While the roller assembly is in service the rims 17 and 18 roll along the uneven upper surface of the track rails formed by the links 14. Concentrated force impacts thus imparted to the outer peripheries of the rims 17 and 18 by the track rails cause the rims to expand. This increases the clearance between the bearing-supporting structure flanges 46 and 46' and the inner peripheries 49 and 49' of the roller rims. Such expansion of the roller rims will have no significant effect because the amount of this clearance is not highly critical. Contrarily, if the outer race of anti-friction bearing units were mounted upon peripheries corresponding to the peripheries 49 and 49', such expansion would loosen the connection between the roller and the bearing mounting therefor to cause misalignment of parts and premature destruction of the roller assembly. With the present structure, however, diametric "growing" of the rail-engaging rims 17 and 18 will have a diminishing displacement effect upon material within the roller webs 48—48' in accordance with the distance radially inwardly from the rims. Consequently any distortion imparted to the webs from the rims essentially vanishes before progressing radially inwardly to the hubs 42 and 42'. Maintenance of the initial conforming fit of the bearing unit inner races 43—43' upon the hub extensions 41—41' is thus assured.

Having thus described a single preferred embodiment of my invention with the view of clearly and concisely disclosing same, I claim:

1. A track roller assembly comprising a non-rotatable shaft; a roller embracing said shaft for rotation substantially coaxially thereabout, said roller including a hub, webs spaced apart axially of said hub and projecting radially therefrom, and rail-engaging rims respectively on said webs, said hub having end portions projecting endwise outwardly respectively from the webs and said rims having respective end portions projecting endwise in radially-spaced concentric relation respectively with the hub end portions to cooperate therewith and with the webs in defining annular recesses in respective ends of the roller; bearing-supporting structures assembled non-rotatively with respect to the shaft respectively in opposed relation with said ends of the roller and each having a web projecting radially outward with reference to the shaft and annular flanges supported by and projecting axially of the shaft from radially outer portions of such structure webs into the roller recess in the roller end opposed thereto; and anti-friction bearing units disposed respectively concentrically with and between said hub end portions and said flanges and comprising inner and outer faces respectively mounted on said hub portions and in said flanges.

2. A track roller assembly comprising a non-rotatable shaft; bearing-supporting structures spaced apart endwise of said shaft and constrained against rotation relatively thereto, each of said structures including a web projecting radially outward with reference to said shaft and an annular flange supported by and projecting axially of the shaft from a radially outer portion of the web; anti-friction bearing units disposed between said bearing-supporting structures and each comprising an outer race and an inner race, the outer races of said bearing units being mounted respectively within said bearing-supporting structure flanges; a track-engaging roller disposed rotatively about said shaft between said bearing units, said roller having oppositely extending hub portions respectively mounted in the inner races of the bearing units, axially spaced rim-supporting webs projecting radially from the hub between and respectively adjacent the bearing units, and axially spaced rail-engaging rims respectively upon such rim-supporting webs and projecting axially oppositely therefrom concentrically about the annular flanges of the bearing supporting structures.

3. A track roller assembly comprising a non-rotatable shaft; bearing-supporting structures assembled non-rotatively with respect to the shaft and spaced apart axially thereof, said bearing structures having respective webs projecting radially outward with reference to the shaft and also having annular flanges respectively supported on radially outer portions of said webs in radially spaced relation from the shaft and arranged with the flange of each structure projecting axially toward the other; anti-friction bearing units each comprising an outer race, an inner race and rollable elements between such races, the outer races of said bearing units being respectively embraced by and mounted in the bearing-supporting structure flanges; a track-engaging roller disposed rotatively about said shaft between the bearing-supporting structures, said roller having a hub with oppositely extending end portions extending into and carried respectively by the inner races of said bearing units, said roller also having axially spaced apart track-engaging rim portions at opposite ends thereof and spaced radially outwardly respectively from the hub end portions to cooperate therewith in forming annular recesses in the ends of the roller, axially spaced radially extending rim supporting webs on the hub respectively solely in support of the rim portions upon the hub, said rim portions having circular inner peripheries forming radial outer walls of said recesses and disposed contiguously with radial outer peripheral portions of the bearing-supporting structure flanges to cooperate therewith in providing an impediment to entry of foreign matter into said recesses; and sealing means in said recesses to provide a sliding seal between the roller and said flanges.

4. A track roller assembly comprising a non-rotatable shaft; a roller embracing said shaft for rotation substantially coaxially thereabout; said roller containing a lubricant receiving cavity; said roller comprising a hub at one end thereof and at one end of said cavity, a web extending radially outwardly from said hub, and a rail-engaging rim on said web in radially spaced relation from the hub, said hub and rim having respective portions projecting axially of the roller in radially spaced concentric relation to cooperate with the web in defining an annular recess in said end of the roller; a bearing-supporting structure assembled non-rotatively with respect to the shaft in opposed relation with said end of the roller and having a web projecting radially outwardly with reference to the shaft an annular flange on a radially outer portion of such structure web, said flange having an inner periphery projecting into the roller recess with such periphery in radially spaced relation from the axially projecting hub portion; an anti-friction bearing unit disposed in said recess and comprising an outer race mounted upon said inner periphery and an inner race mounted upon said hub portion; sealing means providing a sliding seal between the roller and said flange; and means for supplying lubricant to the bearing unit, comprising passage means communicating through the roller web between the roller cavity and the bottom of said recess at a position radially outwardly from the inner race of the bearing unit, and lubricant conducting passage means communicating axially through the roller hub between said cavity and the recess at said end of the roller.

5. A track roller containing a central axial bore having a central enlargement forming a lubricant-receiving cavity within the roller, said roller including a hub at one end of the cavity, a web projecting radially from said hub and a track-engaging rim upon said web, said hub having a portion extending axially toward an end of the roller, said rim having a portion also projecting axially toward said end of the roller and in radially spaced relation from said hub portion to define an annular cavity within such end of the roller, and said web containing lubricant-receiving passage means communicating between the bottom of said recess and said cavity.

6. The combination set forth in claim 5 wherein said lubricant-receiving passage means comprises a plurality of bores extending substantially in parallelism with the central bore of the roller and spaced radially therefrom.

References Cited in the file of this patent

UNITED STATES PATENTS

| Number | Name | Date |
|---|---|---|
| 1,911,171 | Bernhard | May 23, 1933 |
| 2,283,871 | Norelius | May 19, 1942 |
| 2,349,898 | Bechman | May 30, 1944 |
| 2,351,909 | Beretish et al. | June 20, 1944 |